Patented Feb. 29, 1944

2,343,011

UNITED STATES PATENT OFFICE 2,343,011

THIO-PROTEIN PLASTIC

Oskar Huppert, Chicago, Ill.

No Drawing. Application July 11, 1941,
Serial No. 401,977

20 Claims. (Cl. 106—153)

The present invention relates to a solution of a composition of matter suitable for coating or sizing various kinds of fibers or textile fabrics, especially for impregnating of artificial fibers to increase their wet tensile strength.

Furthermore my invention relates to a composition of matter suitable for an adherent moisture and heat proof glue and for the manufacture of plastics, film, filaments and the like.

More specifically this invention relates to the treatment of zein which consists in subjecting zein to the action of thiocyano acetic acid, involving the production of a novel compound—3 zein'-pseudo-thiohydantoin.

This invention employs as a base material a particular type of protein, known as prolamines, especially prolamines as zein from corn, gliadin from wheat and hordein from barley.

The object of the present invention is the formation of derivatives of pseudo-thiohydantoin from these prolamines, which treated with specific plasticizers and dissolved in a specific solvent mixture are compatible with aqueous solutions of soap and soap-like stuffs. A further object of the present invention is the formation of 3 zein'-pseudo-thiohydantoin, a thermoplastic material, either plasticized or not plasticized, which is suitable for gluing plywood and unalterable in appearance in cold or hot water and even over 120° C.

Still another object is the treatment of these plasticized thermoplastic materials with diluted solutions of aldehydes and forming them into suitable shape and curing the shaped masses.

These prolamine derivatives, especially from zein, may be obtained by the reaction of zein with an aqueous solution of thiocyano acetic acid (NCS—CH₂—COOH), whereby the zein' amid of the carbamyl thioglycol acid (NH₂—CO—S—CH₂—CONH zein')

is produced. Zein' denotes here the radical of zein which by assuming the Emil Fischer hypothesis as to the structure of the protein molecules viz.

NH₂—R—CO(NH—R—CO)ₓ—NH—R—COOH per zein', may be represented as (zein'—NH₂).
The reaction takes place as follows:

1. NH₄CNS + ClCH₂COOH=NCSCH₂COOH + NH₄Cl
2. NCSCH₂COOH + zein + H₂O=
NH₂CO—S—CH₂—CONH(zein') + H₂O
3. NH₂CO—S—CH₂—CONH(zein')=CH₂—S
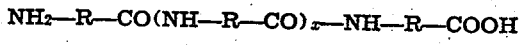
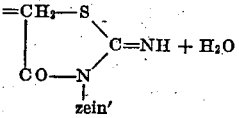

Instead of thiocyano acetic acid one can also use the alpha thiocyano compounds of the propionic, malonic, succinic acid and the like.

Zein'-pseudo-thiohydantoin, obtained by boiling of zein with a 20% solution of thiocyano acetic acid, is a thermoplastic mass of glue consistency and is obtained as a thermoplastic powder if the boiling lasts more than 5 minutes. This orange colored powder, boiled with water in the presence of specific plasticizers, especially esters of organic acids, for example diethyloxalate, dibutyltartrate, diethylcitrate, changes its color and becomes slightly yellow and is now soluble in several solvents, preferably in monochlorohydrine, glycol, diglycolchlorohydrine, ethylene chlorohydrine, propylene chlorohydrine. These solutions have a high viscosity and can be spun directly to artificial fibers according to known methods.

By mixing thoroughly this water resistant stable powder with diluted aqueous solutions of even less than .01% of a low molecular aldehyde, for example formaldehyde, acetaldehyde, crotonaldehyde, etc., at room temperature one can form a plastified mass in desired shapes on suitable rolls such as a rubber mill or a suitable extrusion machine and finally cure it in about 15 minutes at 100–105° C. and a pressure of about 2000 lbs. per square inch in any suitable heated molds as for instance in the usual sheeting press.

The solutions of zein'-pseudo-thiohydantoin in chlorinated polyhydric alcohols are stable in the cold and heat. The greatest advantage of these solutions is that they can be diluted with water to an unlimited extent in the presence of suitable emulgators and that they are therefore very useful in impregnating rayon, casein and soya fibers, whereby the protein solution—in situ in the fiber—can be rapidly coagulated by a subsequent treatment in an acid bath. The individual fibers do not adhere to each other and the protein imparts to them the characteristic and valuable properties of wool.

My invention may be further illustrated by the following examples and it is to be understood that the solvents, plasticizers, hardening agents mentioned therein are merely illustrative.

Example 1

74 g. ammonium thiocyanate and 118 g. monochloro acetic acid are dissolved in 600 cc. water. The solution is heated until boiling and boils then by itself for a certain time. Now 200 g. zein are added under stirring and the solution is boiled again for 5 minutes. One obtains a plastic of glue consistency. By cooling the mass is separated from the liquid and the supernatant liquid is now being removed.

A wood veneer zein glue of a desired body and working life is thus obtained, which can be spread on wood layers by a temperature of more than 40° C. and which can form a bond of high strength and resistance to cold and hot water.

If desired one can mix the sulfur containing zein glue with caustic soda in order to render the adhesive of a desirable consistency.

*Example 2*

The present example is carried out like Example 1 and then set forth in such a manner that one places the zein glue in water, containing 5% diethyloxalate, and boils until the plastic has the consistency of a powder.

*Example 3*

To 500 g. glycol are added 100 g. of a powder, obtained and described in Example 2, and the mixture is put in a vessel, fitted with a stirring device, and the vessel is then placed in a boiling water bath for three hours. One obtains hereby a clear protein solution.

Instead of glycol one can also use monochlorohydrine or other halogenated polyhydric alcohols.

To the resultant solution one can add 80 g. sulfonated castor oil. No tendency to gel on standing occurs.

This textile chemical compound is compatible with very diluted soap solutions and can be used as a product to increase the wet strength of rayon and protein fibers. The solution thus obtained is very useful as a textile finishing product for the impregnation of natural and artificial fibers and textile fabrics. One soaks the fibers or textile fabrics into the impregnating bath for 5 to 10 minutes at room temperature and then subjects them to a centrifugal machine and removes thus the excess liquid. After treating the fibers or textile fabrics in an acid bath and after washing one dries them finally.

*Example 4*

The plastic obtained and described in Example 2 is kneaded with a .01% solution of formaldehyde and is formed into shapes and pressed by about 200 lbs. per square inch at 100-105° C.

It will be understood that the detailed procedures described are capable of wide variations and modifications without departing from the spirit of this invention.

Having now particularly described and ascertained the nature of my said invention and in what manner the same is to be performed, I declare that what I claim is:

1. Process for obtaining a plastic which comprises boiling and agitating a mixture consisting of prolamines and an aqueous solution of a sulfocyanide and the lower aliphatic alpha halogen acids.

2. Process for obtaining a plastic which comprises boiling and agitating a mixture consisting of zein and an aqueous solution of ammonium sulfocyanide and monochloro acetic acid.

3. Process for obtaining a plastic which comprises boiling and agitating a mixture consisting of prolamines and an aqueous solution of a sulfocyanide and the lower aliphatic alpha halogen acids, separating the supernatant liquid from this plastic, introducing water and an ester of polybasic acids to said mass, heating the mixture until the mass assumes the consistency of a plastic powder.

4. Process for obtaining a plastic which comprises boiling and agitating a mixture consisting of zein and an aqueous solution of ammonium sulfocyanide and monochloroacetic acid, separating the supernatant liquid from this plastic, introducing water and diethyloxalate to said mass, heating the mixture until the mass assumes the consistency of a plastic powder.

5. Process for obtaining a solution of a plastic which comprises subjecting prolamines to the action of the lower aliphatic alpha thiocyano acids in an aqueous solution, separating the supernatant liquid from this plastic, introducing water and an ester of polybasic acids to said mass, heating the mixture until the mass assumes the consistency of a plastic powder and dissolving the separated powder in halogenated polyhydric alcohols.

6. Process for obtaining a solution of a plastic which comprises subjecting zein to the action of thiocyano acetic acid in an aqueous solution, separating the supernatant liquid from this plastic, introducing water and diethyloxalate to said mass, heating the mixture until the mass assumes the consistency of a plastic powder and dissolving the separated powder in glycol.

7. Process for obtaining a plastic which comprises subjecting prolamines to the action of the lower aliphatic alpha thiocyano acids in an aqueous solution, separating the supernatant liquid from this plastic, introducing water and an ester of polybasic acids to said mass, heating the mixture until the mass assumes the consistency of a plastic powder and dissolving the separated powder in glycerol monochlorhydrine.

8. Process for obtaining a plastic which comprises subjecting prolamines to the action of the lower aliphatic alpha thiocyano acids and thereafter to the action of water and an ester of polybasic acids until the plastic assumes the consistency of a plastic powder, forming the plastified powder into suitable shapes and soaking this material in diluted aqueous solutions of low molecular aldehydes and curing the shaped masses at elevated temperatures.

9. Process for obtaining a plastic which comprises subjecting zein to the action of thiocyano acetic acid and thereafter to the action of water and diethyloxalate until the plastic assumes the consistency of a plastic powder, forming the plastified powder into suitable shapes and soaking this material in diluted aqueous formaldehyde and curing the shaped masses at elevated temperatures.

10. Pseudothiohydantoin of a prolamine having the formula:

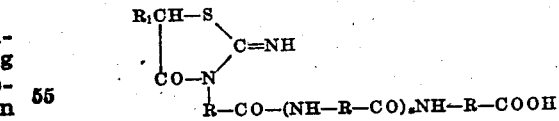

wherein $R_1$ denotes the alkyl radical of the lower aliphatic alpha thiocyano acids, $x$ represents an unknown number of polymers of molecular units of a prolamine.

11. Pseudothiohydantoin of zein having the formula:

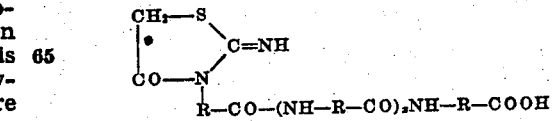

wherein $x$ represents an unknown number of polymers of molecular units of zein.

12. As an article of manufacture a plastic comprising the reaction product of zein and thiocyano acetic acid useful as a waterproof glue.

13. As an article of manufacture a plastic comprising the reaction product from a prolamine and the lower aliphatic alpha thiocyano acids useful as a waterproof glue.

14. As an article of manufacture a plastic powder comprising zein pseudothiohydantoin and diethyloxalate.

15. As an article of manufacture a plastic powder comprising a prolamine pseudothiohydantoin and an ester of polybasic acids.

16. As an article of manufacture a solution comprising a prolamine pseudothiohydantoin dissolved in solvents selected from the class consisting of polyhydric alcohols and their halogenhydrines.

17. As an article of manufacture a solution comprising zein pseudothiohydantoin dissolved in glycerolmonochlorhydrine.

18. As an article of manufacture a plastic comprising a combination of zein pseudothiohydantoin with formaldehyde and diethyloxalate.

19. As an article of manufacture a plastic comprising a combination of a prolamine pseudothiohydantoin with a low molecular aldehyde and an ester of polybasic acids.

20. As an article of manufacture a solution comprising zein-pseudothiohydantoin dissolved in glycol and an ester of polybasic acids.

OSKAR HUPPERT.